(12) United States Patent
Schuster et al.

(10) Patent No.: US 10,207,821 B2
(45) Date of Patent: Feb. 19, 2019

(54) COUPLING MODULE WITH A POSITION SENSOR

(71) Applicant: Hübner GmbH & Co. KG, Kassel (DE)

(72) Inventors: Heinz Schuster, Kassel (DE); Frank Klöckl, Felsberg (DE)

(73) Assignee: Hübner GmbH & Co. KG, Kassel (DE)

( * ) Notice: Subject to any disclaimer, the term of this patent is extended or adjusted under 35 U.S.C. 154(b) by 0 days.

(21) Appl. No.: 15/817,380

(22) Filed: Nov. 20, 2017

(65) Prior Publication Data

US 2018/0141681 A1 May 24, 2018

(30) Foreign Application Priority Data

Nov. 23, 2016 (DE) .................... 20 2016 106 543 U

(51) Int. Cl.
*B64F 1/305* (2006.01)
*E01D 18/00* (2006.01)

(52) U.S. Cl.
CPC ............ *B64F 1/3055* (2013.01); *B64F 1/305* (2013.01); *E01D 18/00* (2013.01)

(58) Field of Classification Search
CPC ......... B64F 1/3055; B64F 1/305; E01D 18/00
USPC ....................................... 14/71.5; 701/1, 13
See application file for complete search history.

(56) References Cited

U.S. PATENT DOCUMENTS

| | | | | |
|---|---|---|---|---|
| 3,683,440 A * | 8/1972 | Xenakis | ................ | B64F 1/3055 14/71.5 |
| 4,553,720 A * | 11/1985 | Harder | ................ | B64F 1/3055 14/71.5 |
| 4,559,660 A | 12/1985 | Lichti | | |
| 5,105,495 A * | 4/1992 | Larson | ................ | B64F 1/305 14/71.5 |
| 5,253,381 A * | 10/1993 | Rawdon | ................ | B64C 1/22 14/71.5 |
| 5,950,266 A * | 9/1999 | Streeter | ................ | E01D 15/24 14/69.5 |
| 6,637,063 B1 * | 10/2003 | Hutton | ................ | B64F 1/3055 14/71.5 |
| 6,898,816 B2 * | 5/2005 | Tholen | ................ | B64F 1/3055 14/69.5 |
| 7,030,354 B2 * | 4/2006 | Oki | ................ | B64F 1/002 14/71.1 |
| 8,429,780 B2 * | 4/2013 | Scharf | ................ | B64F 1/3055 14/71.5 |

(Continued)

FOREIGN PATENT DOCUMENTS

| | | |
|---|---|---|
| CA | 911113 A | 10/1972 |
| EP | 2397411 B1 | 8/2012 |
| WO | 03072435 A1 | 9/2003 |

*Primary Examiner* — Raymond W Addie
(74) *Attorney, Agent, or Firm* — Dinsmore & Shohl LLP

(57) ABSTRACT

A coupling module for coupling a passenger boarding bridge with an aircraft has a floor assembly and a canopy roof spanning the floor assembly. The coupling module and/or the floor assembly is configured to be received at a cabin of a passenger boarding bridge such that the coupling module and/or the floor assembly can swivel relative to the cabin around a horizontal swivel axis. A position sensor is operable to measure an inclination of the floor assembly relative to a geodetic horizontal position.

7 Claims, 4 Drawing Sheets

(56) References Cited

U.S. PATENT DOCUMENTS

| | | | |
|---|---|---|---|
| 2003/0145400 A1* | 8/2003 | Hinkle | B64F 1/305 14/71.5 |
| 2004/0187234 A1 | 9/2004 | Hutton et al. | |
| 2005/0198750 A1* | 9/2005 | Spencer | B64F 1/002 14/71.5 |
| 2008/0109970 A1* | 5/2008 | Hutton | B64F 1/002 14/71.5 |
| 2009/0119854 A1* | 5/2009 | Nelson | A61B 18/1492 14/71.5 |

* cited by examiner

COUPLING MODULE WITH A POSITION SENSOR

CROSS REFERENCE

This application claims priority from German Application No. DE202016106543.7 filed Nov. 23, 2016, the entire content of which is incorporated herein by reference.

FIELD OF THE INVENTION

The invention relates to a coupling module for coupling a passenger boarding bridge with an aircraft, wherein the coupling module has a canopy roof and a floor assembly spanned by the canopy roof, and wherein the coupling module and/or the floor assembly is received at a cabin of the passenger boarding bridge so that it can swivel relative to the cabin around a horizontal swivel axis. The invention further relates to a control system for controlling the swivel movement of such a coupling module around the horizontal swivel axis.

BACKGROUND

Passenger boarding bridges are sufficiently known from the prior art. Such bridges are used for allowing people to cross from the aircraft directly into the airport building. Since the access into the airport building is often placed higher than the doorway of the aircraft, the passenger boarding bridges, which are held at their front mobile end by an undercarriage, are often inclined downward toward the doorway of the aircraft.

At its bottom end, the passenger boarding bridge comprises a cabin that can swivel around a vertical axis, the coupling module for crossing from the cabin into the aircraft being disposed at the front end of the cabin.

In order to fit the coupling module to the doorway of the aircraft, the module can be swiveled at the cabin of the passenger boarding bridge. A cabin that is pivotable around a vertical axis is described for example in U.S. Pat. No. 4,559,660 A1.

Furthermore, it is known to swivel the floor assembly around a horizontally running axis. This is disclosed, for example, in EP 2 397 411 B1, which proposes that the coupling module and thus also the floor assembly be held by the cabin of the passenger boarding bridge in such a manner that it can swivel around a horizontally running central longitudinal axis. The swiveling of the floor assembly of the coupling module is carried out by an operator, who still needs to orient the floor assembly horizontally after the floor assembly has been moved to the height of the floor of the aircraft corridor at the aircraft door. To this end, the passenger boarding bridges usually have an operating console, by way of which the operator must control the movements of the passenger boarding bridge in height, the movements of the cabin around the vertical axis and the movements of the coupling module around a horizontal axis.

However, the operation is often not carried out to the fullest possible extent. The reason for this is often a lack of training of the operator and time constraints, as the passenger boarding bridge must often be moved up to the aircraft very quickly.

SUMMARY OF THE INVENTION

The problem underlying the invention is the development of a coupling module for forming an interface between the cabin of a passenger boarding bridge and an aircraft, which allows for a simplified control of the movement of the coupling module toward the doorway of the aircraft. In particular, said movement is to be accelerated.

This problem is solved based on a coupling module according to a description herein and based on a control system in conjunction with the respectively characteristic features. Advantageous developments of the invention are also described.

The invention includes the technical teaching that the coupling module comprises a position sensor, by means of which the inclination of the floor assembly relative to a geodetic horizontal position can be measured.

The central idea of the invention is the application of the position sensor, by means of which the inclination of the position sensor relative to a geodetic horizontal position can be measured. If the position sensor is fastened to the floor assembly, for example by gluing it to the floor assembly at a suitable location or applying it in a module to the floor assembly, the position sensor makes it possible to provide data on the inclination of the floor assembly relative to the geodetic horizontal position. Thus the structure of the coupling module is complemented by a position sensor, so that a control member of the coupling module is provided, by means of which it becomes possible to bring the floor assembly and thus the canopy roof spanning the floor assembly into a horizontal position. According to the invention, the position sensor is disposed on the coupling module, but an arrangement of the position sensor directly on the floor assembly is particularly suitable. However, an alternative arrangement of the position sensor is also conceivable, in particular at least indirectly on the floor assembly. For instance, the position sensor can also be disposed on the canopy roof or on a hinged frame of the coupling module, which can be provided for connecting the canopy roof to the floor assembly in a supporting manner.

Position sensor, which can determine their position relative to a geodetic horizontal are generally known. To this end, the position sensors are connected to a corresponding electronic component, by means of which the positional orientation of the position sensor relative to the geodetic horizontal can be determined. If the position sensor is disposed on a component, whose horizontal position must be determined and correspondingly set or updated, this can be done by means of a position sensor in conjunction with the corresponding electronic component.

The main advantage of the development of a coupling module according to the invention lies in the possibility to carry out the horizontal orientation of the coupling module, and in particular of the floor assembly, by way of the position sensor. An operator therefore no longer needs to adjust the horizontal position of the floor assembly by way of an operating console, since the coupling module can move itself into a horizontal position by means of the position sensor in any situation in which the position passenger boarding bridge needs to be adjusted. Thereby, the coupling module itself is simplified and in particular the operation of the passenger boarding bridge, since an operator no longer needs to take care of the horizontal positioning of the floor assembly and thus of the coupling module.

According to an advantageous embodiment the coupling module, and in particular the floor assembly, comprise a swivel motor, by means of which the coupling module, respectively the floor assembly, can be pivoted around the horizontal swivel axis. If the swivel axis is disposed in or under the floor assembly, a support body can be centrally disposed in the transverse direction under the floor assembly, whereby the swivel axis then runs perpendicularly to the transverse direction and is disposed under the walkable surface of the floor assembly. Thus, the floor assembly can be tilted in the manner of a seesaw around the centrally and transversely arranged swivel axis, so that a misalignment of the floor assembly relative to the geodetic horizontal can be detected by means of the position sensor and compensated for by an associated control system. Alternatively, it is also possible for the swivel axis to run centrally through the coupling module, so that, when the axis is supported in this manner, the floor assembly performs a lateral swing-like movement. In both variants, the canopy roof and the hinged frame, on which the canopy roof is disposed, both swivel along with the swivel movement.

Furthermore, a control unit is advantageously provided, which is designed to interact with the position sensor and/or the swivel motor. The control unit is designed, in particular, to detect position data regarding the geodetic position of the floor assembly using the position sensor. The control unit is designed in particular for actuating the swivel motor. The control unit can thus comprise or be the electronic component, by means of which the horizontal position of the floor assembly can be adjusted in conjunction with the position sensor. The control unit can actuate the swivel motor for carrying out the appropriate adjustments of the floor assembly. The control is particularly advantageously carried out as a function of the position data of the geodetic position of the floor assembly detected by means of the position sensor. In this regard, the control unit is designed in such a manner that through the interaction with the position sensor and through the interaction with the swivel motor, the floor assembly can be maintained at or moved into a geodetic horizontal position independently from a movement of the passenger boarding bridge and/or independently from a movement of the cabin. The control unit, the position sensor and the swivel motor thus form the control system for controlling the swivel movement of the coupling module.

Furthermore, the position sensor is advantageously designed to measure an inclination of the floor assembly relative to a geodetic horizontal position separately from the cabin receiving the floor assembly. More specifically, there is no need to measure an angular position of the coupling module, for instance as attached to the cabin of the passenger boarding bridge, as this allows only for measuring relative angular positions; an absolute geodetic horizontal position cannot be determined based on a relative measurement. In contrast, the position sensor is designed, in accordance with the invention, in such a manner that it can determine its position relative to the horizontal independently from any other components. If the position sensor is attached to a component, i.e. for example to a floor assembly of the coupling module, the geodetic position of the floor assembly can be determined.

Assuming that the corridor floor of the aircraft is oriented horizontally, it can also be assumed that the bottom door edge of the doorway of the aircraft also runs horizontally. If the control system now aligns the coupling module with the horizontal, the floor assembly of the coupling module will also be oriented parallel to the orientation of the corridor floor of the aircraft. An offset of the floor assembly relative to the corridor floor of the aircraft is thus avoided.

The invention further relates to a control system for controlling the swivel movement of a coupling module that is received at a cabin of the passenger boarding bridge for coupling a passenger boarding bridge to an aircraft and that comprises a canopy roof and a floor assembly spanned by said canopy roof and wherein the swivel movement relative to the cabin can be performed around a horizontal swivel axis. According to the invention, the control system comprises a position sensor by means of which a horizontal position of the floor assembly relative to a geodetic horizontal position can be adjusted. In particular, the coupling module and thus the floor assembly can be brought to the horizontal position or maintained in the horizontal position by the control system in conjunction with the position sensor, independently from further movements of the passenger boarding bridge or the cabin on which the coupling module is received.

According to another embodiment of the control system, the control system comprises a control unit, which is designed as a horizontal swivel axis for swiveling the floor assembly by interacting with the position sensor and/or with a swivel motor. The control unit is more specifically designed in such a manner that the floor assembly can be maintained in the horizontal position or brought into the horizontal position through an interaction with the position sensor and an interaction with the swivel motor, independently from a movement of the passenger boarding bridge and/or independently from the movement of the cabin.

BRIEF DESCRIPTION OF THE DRAWINGS

In the following, additional measures improving the invention are described in more detail together with the description of a preferred exemplary embodiment of the invention, based on the drawings. In the drawings.

DETAILED DESCRIPTION

Figure 1:
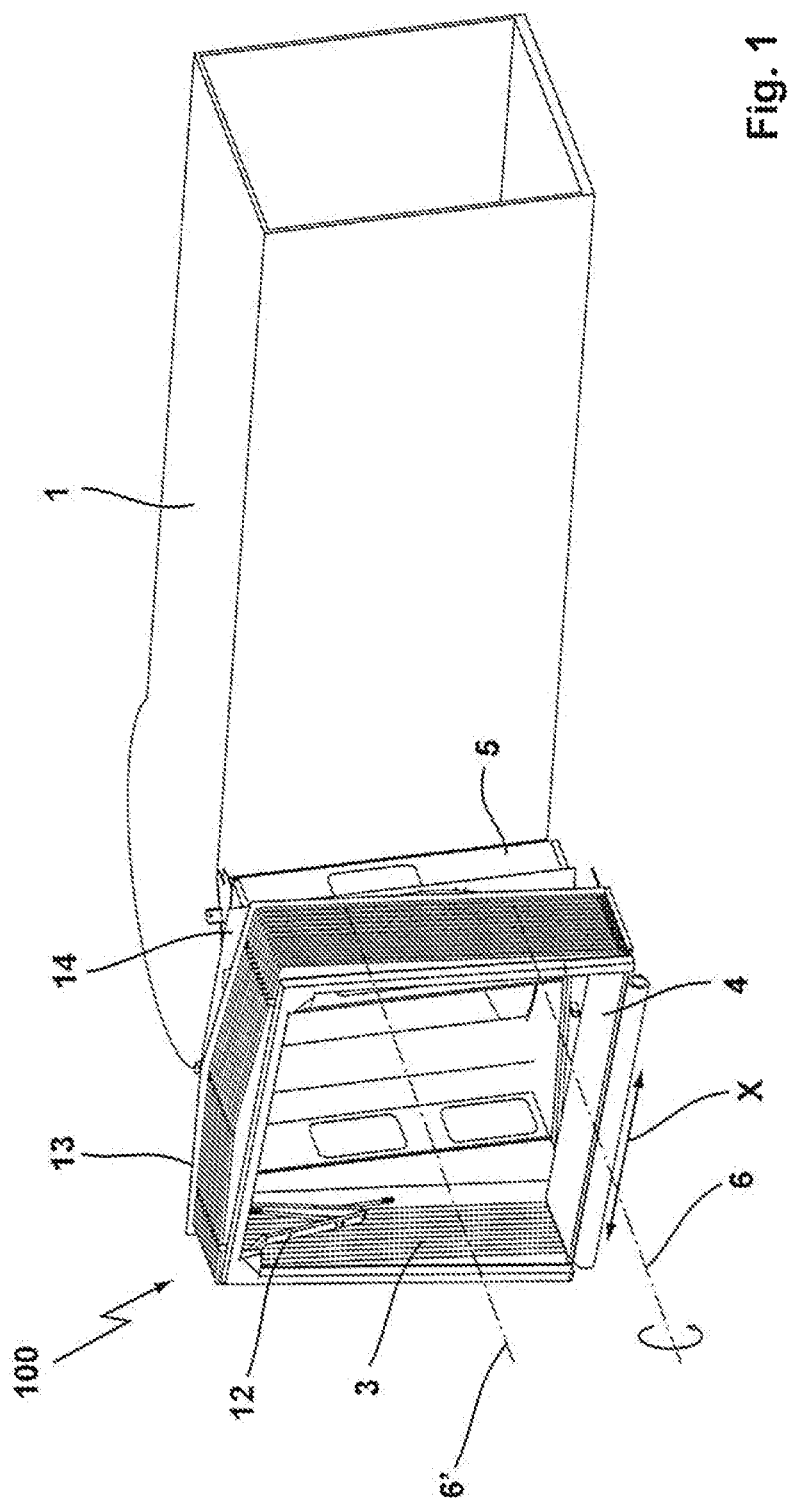
FIG. 1 is a perspective view of a passenger boarding bridge with a coupling module disposed on a cabin of the passenger boarding bridge.

FIG. 1 shows a coupling module 100 disposed on a passenger boarding bridge 1. A cabin 5, which is part of the passenger boarding bridge 1, is disposed at a front end of the passenger boarding bridge 1 pointing toward an aircraft that is not shown. The coupling module 100 is disposed on the cabin 5 so that it can swivel around an imaginary horizontal swivel axis 6 in the floor area, or alternatively around an imaginary swivel axis 6' centrally traversing the coupling module 100, the swivel axis 6 running in the area of the floor assembly in the subsequent FIGS. 2, 3 and 4.

On its free side, the coupling module comprises a frame disposed on a canopy roof 3, which can be fittingly disposed on the outer hull of the aircraft. A respective articulated arm 12 is disposed on both sides inside the coupling module 100 and serves to perform a deployment movement of the canopy roof 3 of the coupling module 100, in order to be able to dock the front side of the canopy roof 3 on the outer hull of the fuselage of the aircraft. The representation of the coupling module 100 additionally comprises a floor assembly 4 onto which passengers can step immediately after leaving the aircraft.

If the coupling module 100 swivels around the floor-side swivel axis 6 or central swivel axis 6', the coupling module 100 performs a swivel movement around the swivel axis 6 or 6'. The canopy roof 3 with the articulated arms 12 and a rear-side hinged frame 13 swivel along with the swivel movement of the coupling module 100 and form a swiveling unit together with the floor assembly 4. A base frame 14 is located behind the hinged frame 13 on the cabin 5, in front of which the hinged frame 13, which is also part of the swiveling unit, can swivel.

Figure 2:
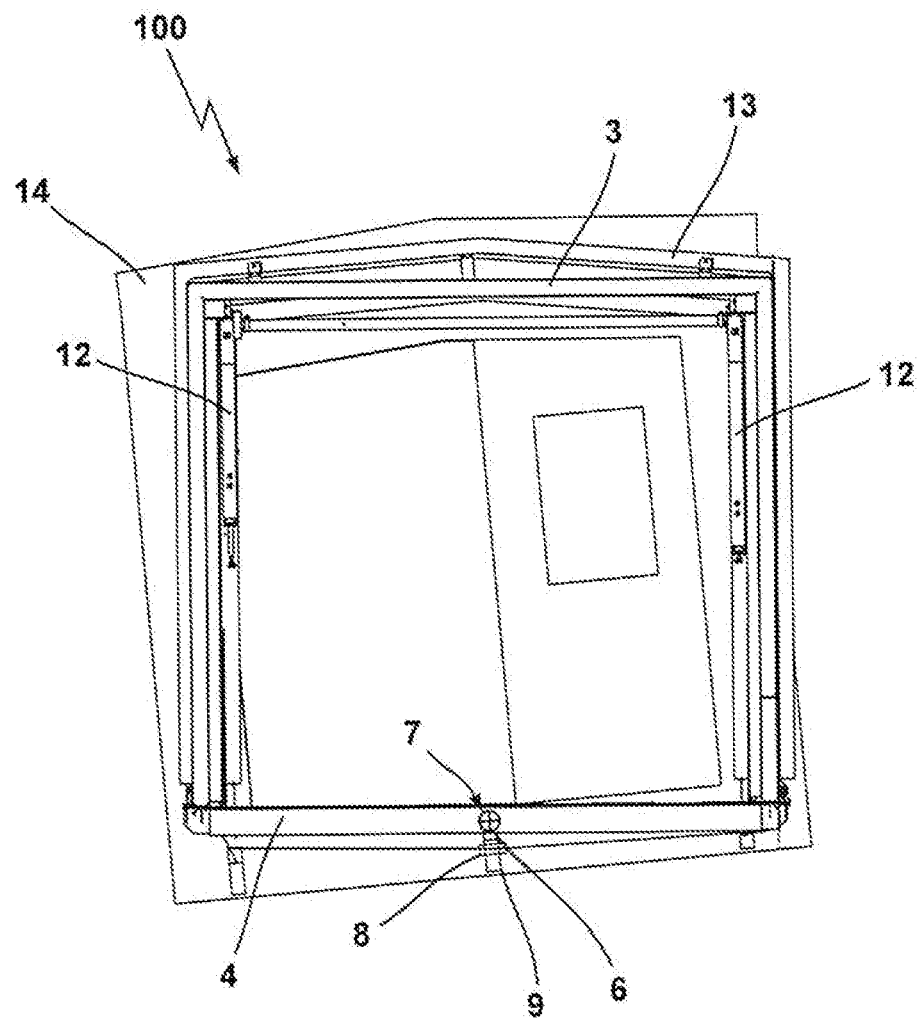
FIG. 2 is a front view of the coupling module, wherein the coupling module is represented with a horizontally oriented floor assembly, and wherein the passenger boarding bridge is skewed relative to the horizontal floor assembly.
Figure 3:
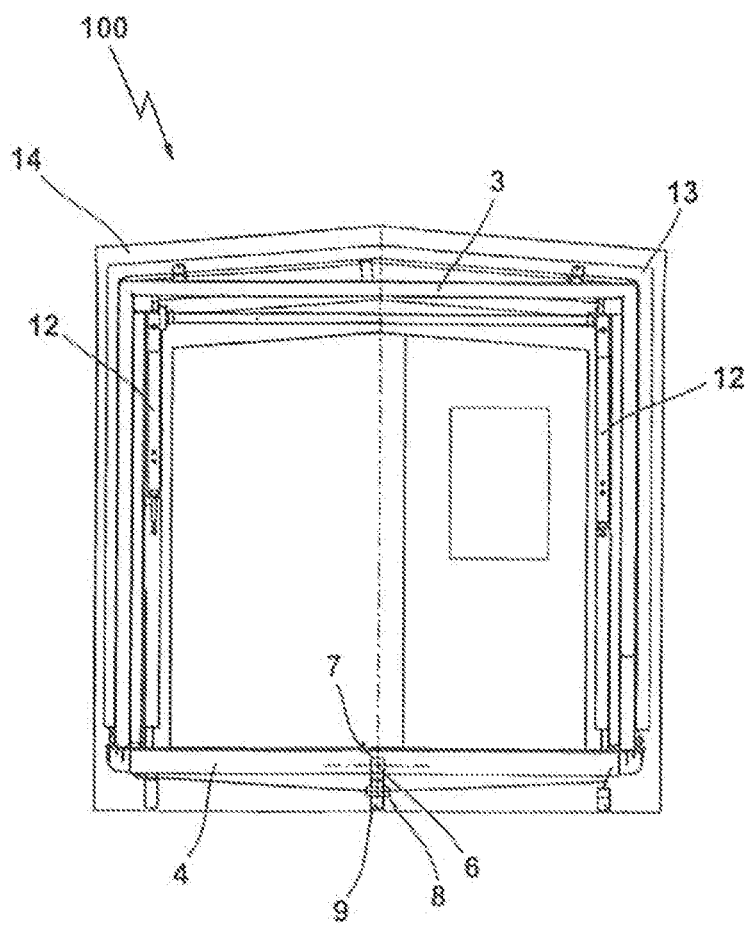
FIG. 3 is the front view of the coupling module disposed on the skewed passenger boarding bridge as compared to FIG. 2.

FIGS. 2 and 3 respectively show a front view of the coupling module 100 as disposed on the passenger boarding bridge, which is indicated by the base frame 14 ending the passenger boarding bridge in the direction of the coupling module 100. The coupling module 100 is formed with the illustrated components at least by the floor assembly 4 and the canopy roof 3 spanning the floor assembly 4, a rear-side hinged frame 13 receiving the canopy roof 3 in a supporting manner and connecting it with the floor assembly 4. The articulated arms 12 serve to deploy the canopy roof 3, in order to dock it on the outside of the aircraft.

FIG. 2 shows the coupling module 100 in a horizontal arrangement with a rear-side skewed base frame 14 and FIG. 3 shows the coupling module 100 still in a horizontal position, but in which the base frame 14 and thus the passenger boarding bridge has been rotated, for example because of a height adjustment of the front free end of the passenger boarding bridge. In doing so, the coupling module 100 can be maintained in a horizontal position, despite the front free end of the passenger boarding bridge having been rotated relative to the coupling module 100 as a consequence of a height adjustment.

The coupling module 100 is received in such a manner that it can swivel around a swivel axis 6, the swivel axis 6, illustrated for example by a support body 9, receiving the coupling module 100 at the passenger boarding bridge in a supporting manner According to the invention, a position sensor 7 is arranged on the coupling module 100. The position sensor 7 is disposed for example in the swivel axis 6 at the floor assembly 4. Thus the position sensor 7 can swivel along with a swivel movement of the floor assembly 4 around the swivel axis 6. If the floor assembly 4 is not in a horizontal position, as shown in FIG. 2, the position sensor 7 is also not in a horizontal position, which can be detected by means of the position sensor 7.

By using an appropriate electronic component in conjunction with the position sensor 7, the position of the coupling module 100 can be adjusted in such a manner that the floor assembly 4 takes up a horizontal alignment. A swivel motor 8, which is exemplarily shown in an arrangement in the area of the support body 9, serves to swivel the coupling module 100 around the swivel axis 6.

Figure 4:
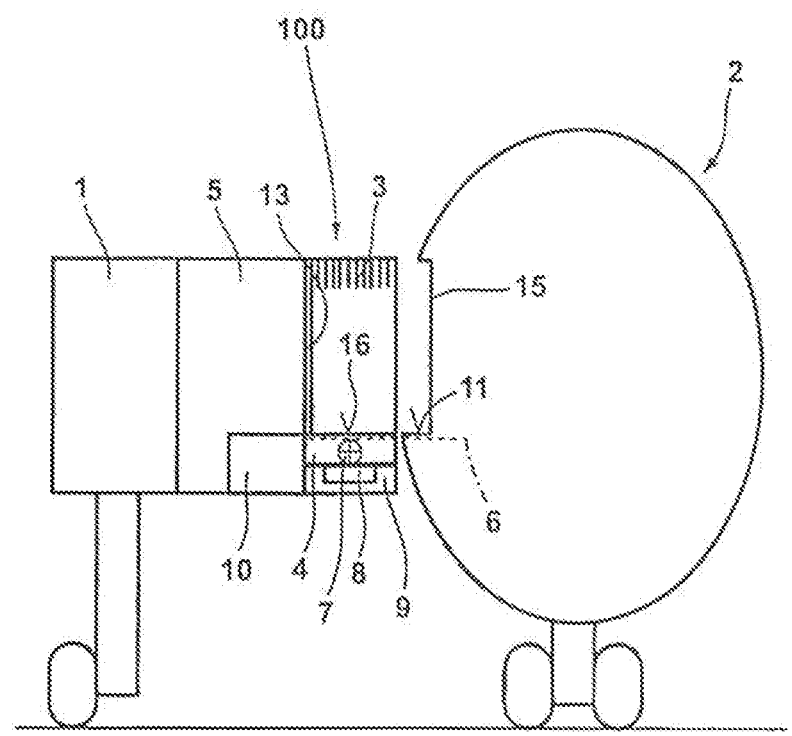
FIG. 4 shows a schematic lateral view of the passenger boarding bridge with a coupling module disposed in front of an aircraft.

Finally, FIG. 4 schematically shows the arrangement of the passenger boarding bridge 1 with the front-side cabin 5 and with the coupling module 100 disposed on the cabin 5 at a distance from the door 15 of an aircraft 2. The floor area of the door 15 forms a corridor floor 11 of the aircraft 2, which is assumed to run horizontally. The coupling module 100 is arranged in front of the door 15 and must swivel around the swivel axis in such a manner that the floor assembly 4 of the coupling module 100 takes up a horizontal position, in order to coincide with the horizontal position of the corridor floor 11 of the aircraft 2.

The coupling module 100 is schematically illustrated and the floor assembly 4 is spanned by a canopy roof 3, which is also schematically illustrated in a non-deployed position.

The floor assembly 4 and thus the canopy roof is received via the support body 9, the canopy roof being disposed at the floor assembly 4 so that it is received in a supported manner by the hinged frame 13 and spans the floor assembly.

A position sensor 7, with which a horizontal position is detectable, is arranged on the floor assembly 4, so that the horizontal orientation of the floor assembly 4 with respect to the top-side walkable area 16 can be detected.

The arrangement further includes a control unit 10 and the control unit 10 can interact with the position sensor 7 and with the swivel motor 8. If the position sensor 7 detects a non-horizontal orientation of the floor assembly 4, the control unit 10 for detecting the orientation of the floor assembly 4 based on the position data of the position sensor 7 is designed to actuate the swivel motor 8 in such a manner that the floor assembly 4 ultimately takes up a horizontal position. In so doing, if the cabin 5 is for example rotated due to a height adjustment of the passenger boarding bridge, the coupling module 100 can fundamentally remain in the horizontal position, independently from the position of the cabin 5, in so far as the control system including the control unit 10, the position sensor 7 and the swivel motor 8 adjusts the horizontal position of the floor assembly 4 and thus the position of the canopy roof 3. This results in a fundamentally horizontal position of the coupling module 100 that is adjusted to the horizontal position of the corridor roof 11, so that the passenger boarding bridge 1 merely needs to be adjusted in height, in order to bring the walkable area 16 of the floor assembly 4 in alignment with the height of the corridor floor 11 of the door 15 of the aircraft 2.

The invention is not limited in its implementation to the afore-mentioned preferred exemplary embodiment. Rather, a number of variants are conceivable, which make use of the outlined solution in fundamentally different embodiments. All the features and/or advantages arising from the claims, the description or the drawings, including design details or spatial arrangements, can be essential to the invention both as such and in various combinations.

LIST OF REFERENCE NUMBERS

100 Coupling module
1 Passenger boarding bridge
2 Aircraft
3 Canopy roof
4 Floor assembly
5 Cabin
6 Swivel axis
6' Swivel axis
7 Position sensor
8 Swivel motor
9 Support body
10 Control unit
11 Corridor floor
12 Articulated arm
13 Hinged frame
14 Base frame
15 Door
16 Walkable area
X Transverse direction

The invention claimed is:

1. A coupling module for coupling a passenger boarding bridge with an aircraft, comprising:
a floor assembly having a walkable surface;
a canopy roof spanning the floor assembly;
a support body centrally disposed with respect to a transverse direction under the floor assembly, a swivel axis defined perpendicularly to the transverse direction and disposed under the walkable surface of the floor assembly;

the coupling module configured to be received at a cabin of a passenger boarding bridge such that the coupling module can swivel relative to the cabin around the swivel axis;

a position sensor operable to measure an inclination of the floor assembly relative to a geodetic horizontal position; and a control unit operable to interact with the position sensor and a swivel motor, the control unit being operable via the position sensor and swivel motor to maintain or move the floor assembly into the geodetic horizontal position independently from a movement of the passenger bridge and of the cabin.

2. The coupling module according to claim 1, wherein the swivel motor operable to swivel the coupling module or the floor assembly around the swivel axis.

3. The coupling module according to claim 1, wherein the position sensor is operable to measure an inclination of the floor assembly relative to a geodetic horizontal position separately from the cabin receiving the floor assembly.

4. The coupling module according to claim 1, wherein the control unit is operable to detect position data regarding the geodetic position of the floor assembly issued by the position sensor.

5. The coupling module according to claim 4, wherein the control unit is operable to actuate the swivel motor.

6. The coupling module according to claim 5, wherein the actuation is carried out as a function of the position data of the geodetic position of the floor assembly detected by the position sensor.

7. A control system for controlling a swivel movement of a coupling module that is received at a cabin of a passenger boarding bridge for coupling the passenger boarding bridge to an aircraft, the coupling module of the type having a canopy roof and a floor assembly spanned by the canopy roof and wherein the swivel movement relative to the cabin can be performed around a horizontal swivel axis, comprising:

a position sensor by means of which a horizontal position of the floor assembly relative to a geodetic horizontal position can be adjusted;

a control unit operable to interact with the position sensor and a swivel motor, wherein the control unit is operable via the position sensor and swivel motor to maintain or move the floor assembly into a geodetic horizontal position independently from a movement of the passenger bridge and of the cabin; and a support body centrally disposed with respect to a transverse direction under the floor assembly, the swivel axis defined perpendicularly to the transverse direction and disposed under a walkable surface of the floor assembly.

* * * * *